United States Patent [19]

Dickie et al.

[11] Patent Number: 5,182,032
[45] Date of Patent: Jan. 26, 1993

[54] APPARATUS FOR PLASTIC INJECTION OVERMOLDING

[75] Inventors: Robert G. Dickie, Newmarket; Michael Phillips, Mississauga, both of Canada

[73] Assignee: Paige Manufacturing Company Incorporated, Newmarket, Canada

[21] Appl. No.: 697,504

[22] Filed: May 3, 1991

Related U.S. Application Data

[63] Continuation of Ser. No. 551,381, Jul. 9, 1990, abandoned.

[51] Int. Cl.$^5$ .................. B29C 45/14; B29C 45/36; B29C 45/42
[52] U.S. Cl. .................................... 249/91; 249/93; 249/96; 264/275; 264/277; 264/278; 425/116; 425/129.1
[58] Field of Search .................. 264/278, 272.15, 261, 264/271.1, 275, 277; 249/91, 93, 96, 97, 94; 425/116, 129.1

[56] References Cited

U.S. PATENT DOCUMENTS

| | | | |
|---|---|---|---|
| 2,973,501 | 2/1961 | Mapelsden et al. | 264/272.15 |
| 4,083,902 | 4/1978 | Clyde | 264/261 |
| 4,381,908 | 5/1983 | Roth | 264/278 |
| 4,395,375 | 7/1983 | Ferris et al. | 264/261 |
| 4,470,786 | 9/1984 | Sano et al. | 264/278 |
| 4,556,190 | 12/1985 | Smith | 425/116 |
| 4,574,474 | 3/1986 | Langham | 264/272.15 |
| 4,629,597 | 12/1986 | Charlebois et al. | 264/272.15 |
| 4,821,413 | 4/1989 | Schmitt et al. | 264/272.15 |
| 4,860,436 | 8/1989 | Hirabayashi et al. | 264/275 |
| 4,954,307 | 9/1990 | Yokoyama | 425/116 |
| 5,044,912 | 9/1991 | Billings et al. | 425/116 |

FOREIGN PATENT DOCUMENTS

| | | | |
|---|---|---|---|
| 1353603 | 5/1974 | United Kingdom . | |
| 1430579 | 3/1976 | United Kingdom | 264/278 |
| 2110587 | 6/1983 | United Kingdom | 264/272.15 |

Primary Examiner—Jan H. Silbaugh
Assistant Examiner—Brian J. Eastley

[57] ABSTRACT

An injection molding apparatus, in which non-rigid or flexible components intended to be encapsulated within the interior of an injection molded product, is provided. The flexible components are held in position in the interior of the mold cavity during the injection operation by thin, rigid forks or blades with surfaces interior to the mold cavity contoured to mate with and capture the non-rigid, flexible component. Such forks or blades can be retracted prior to the final packing portion of the molding cycle to allow plastic flow into the void left by the retracted blades, or the blades can be retracted after the end of the injection cycles and voids left in the molded product. Portions of the encapsulated components themselves can be fashioned to capture and hold portions of other encapsulated components during the injection process.

2 Claims, 2 Drawing Sheets

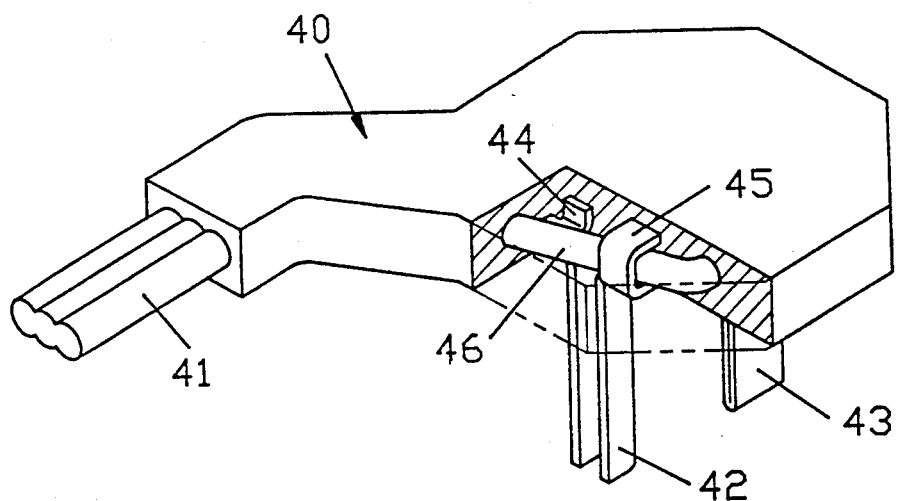
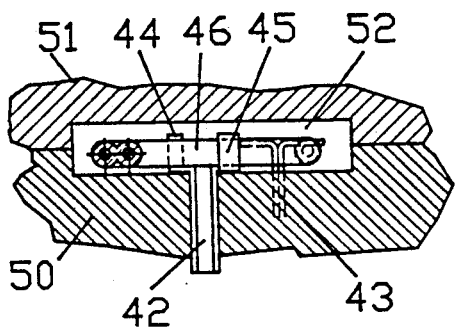
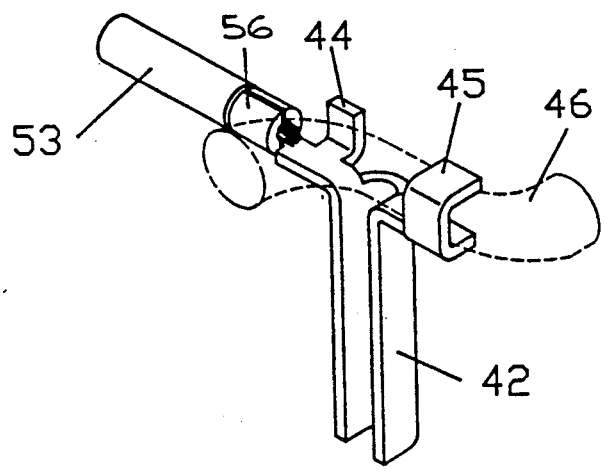

APPARATUS FOR PLASTIC INJECTION OVERMOLDING

CROSS REFERENCE TO RELATED APPLICATION

This application is a continuous of application Ser. No. 551,381, filed Jul. 9, 1990, now abandoned.

TECHNICAL FIELD

This invention relates to methods and apparatus for plastic injection molding, and, more particularly, to molded plastic products with non-rigid encapsulated components and methods of making such products.

BACKGROUND OF THE INVENTION

It is well known to encapsulate components within a plastic molding die cavity by rigidly affixing such components to or through the walls of the cavity. It is also known to avoid the appearance of holding devices at the surface of the molded product by providing retractable holding devices which retract out of the molding cavity while the molding material is "setting up." An example of the latter technique is shown in L. H. Morin U.S. Pat. No. 3,420,929, granted Jan. 7, 1969. It is also possible for the holding devices to retract into the center of the molded product, as shown in R. K. Piotrovosky U.S. Pat. No. 4,470,784, granted Sep. 11, 1984. Such prior art holding devices and techniques, however, do not hold the encapsulated component in a precisely defined position, and hence are of limited usefulness. In some applications, for example, the encapsulated components must maintain precise positions relative to other encapsulated components or with respect to the exterior contours of the molded product.

The problem of precisely positioning encapsulated components within an injection molding cavity can be further complicated by two additional factors. If the component to be encapsulated is not rigid, the problem of holding it in a precise position is far more difficult. Furthermore, the dimensions of the molded product may be such that very little leeway exists for positioning the encapsulated component away from the surfaces of the mold. If the component is not precisely and firmly positioned in the interior of a thin molding cavity, for example, a problem called "component breakout" occurs in which some or all of the encapsulated component is visible at the surface of the molded product. Such breakout is normally grounds for rejecting the product.

SUMMARY OF THE INVENTION

In accordance with the illustrative embodiment of the present invention, encapsulated components, and particularly non-rigid encapsulated components, are captured at a precise position in the interior of the mold cavity by means of retractable thin, flat, rigid "blades" or "forks" having one end fabricated with a contour which mates with and captures the encapsulated component. The blade or fork rigidly holds the encapsulated component at a precise position in the interior of the mold cavity during the plastic injection process. Just before the last "packing" portion of the injection molding cycle, the blades or forks can be retracted to allow the molding material to flow and fill the thin voids left by the blades or forks. To assist in retraction, the blades are made as thin as possible and yet maintain sufficient rigidity to hold the encapsulated component in the precise position desired. Alternatively, the blades can be left in the mold until after the plastic molding material has set up, and then withdrawn, leaving very small, thin voids in the molded product. This latter procedure is possible only if thin slots left by the blades or forks do not adversely affect the usefulness or appearance of the molded product.

In accordance with one feature of the invention, the blade or fork can be biased into the interior of the molding cavity with a spring the force of which is overcome only by the higher pressure of the final "packing" portion of the molding cycle. The blades or forks will then be automatically ejected from the molding cavity at precisely the correct time to permit filling the voids left behind by the retracting blades during the packing period.

In accordance with another feature of the present invention, the blades or forks are all introduced into the mold cavity though only one of the mold dies. In this way, any surface irregularities caused by the withdrawal of the blades or forks are all located on one side of the molded product. This side of the molded product will, of course, be the least visible side of the molded product from the point of view of the user.

For convenience, the present invention will be described in connection with the molding of an ultra thin electrical plug in which the electrical wires must be maintained in a precise position within the mold cavity to avoid "breakout" of the wires to the surface of the molded plug. Such a plug is described, for example, in applicant's U.S. Pat. No. 4,927,376, granted May 22, 1990, and assigned to applicant's assignee. The least visible side of such a molded plug is the side facing the wall outlet when the plug is inserted into the wall socket. It is to be understood, however, that the methods and apparatus of the present invention can be applied to the injection molding of many other products, particularly products requiring the encapsulation and precise positioning of non-rigid components.

BRIEF DESCRIPTION OF THE DRAWINGS

A complete understanding of the present invention may be gained by considering the following detailed description in conjunction with the accompanying drawings, in which:

FIG. 6 shows a perspective partial sectional view of a molded three-prong electrical plug molded by using the position-holding blades of the present invention and tab clips on one of the electrical prongs to assist in holding the electrical wires in position during the molding process;

FIG. 7 shows a cross-sectional view of the cavity mold used to produce the molded product of FIG. 6, showing the electrical ground prong holding the electrical wire in position; and FIG. 8 is a perspective view of the tab clips on the electrical ground prong of FIG. 6 used to assist in holding the electrical wire in position during the molding process.

To facilitate reader understanding, identical reference numerals are used to designate elements common to the figures.

DETAILED DESCRIPTION

Figure 1:
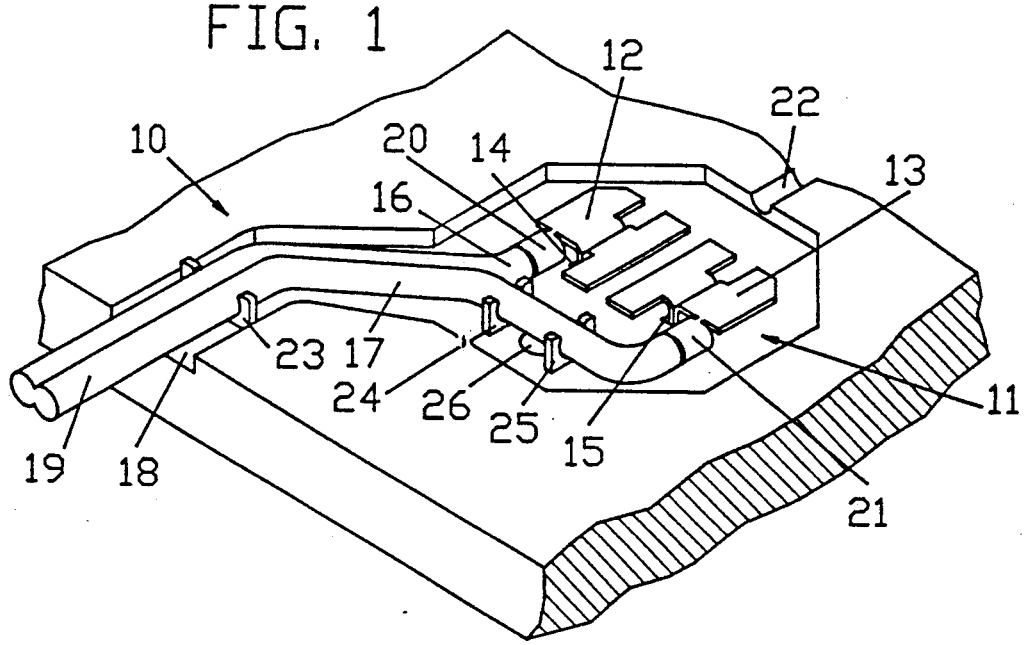
FIG. 1 shows a partially cut-away perspective view of the lower die of a plastic injection mold showing the arrangement of both rigid and non-rigid components within the molding cavity, and showing the use of thin blades to hold electrical wires in place during the injection operation.

In FIG. 1 there is shown a partial perspective view of the lower die 10 of a cavity injection mold comprising a mold half cavity 11 in the shape of a thin hexagonal electrical plug. Electrical prongs or connector pins connected to stabilizing lands 12 and 13 extend out of cavity 11 through slots 14 and 15, respectively. Slots 14 and 15 have bottoms located so as to precisely position lands 12 and 13 in the interior of mold cavity 11. Insulated wires 16 and 17 join together in sleeve portion 18 of mold cavity 11 to form line cord 19. One end of wire 16 is electrically attached to land 12 while one end of wire 17 is electrically attached to land 13. In addition, wire 16 is physically attached to land 12 by crimp 20 while wire 17 is physically attached to land 13 by crimp 21. An upper die, not shown in FIG. 1, has a half cavity mirroring cavity 11 in die 10, but without the slots for the electrical plugs. An injection runner or half gate 22, together with the mating half gate on the upper die, forms a entry port for injecting a molten plastic such as polyvinylchloride (PVC) into the assembled mold.

In practice, the two half cavities are fastened tightly together in the core of a molding machine. Molten plastic is injected under high pressure (50-150 tons per square inch) to entirely fill all of the voids in the mold cavity. At the very end of the molding cycle, the injection pressure is raised even higher for a brief period to ensure complete filling of all voids in the cavity. This higher pressure at the end of the injection cycle is called the "packing" portion of the injection molding cycle. After the plastic material has cooled, possibly assisted by cold water circulating in the interior of the mold body, the mold is opened and the molded product is ejected from the mold by means of an ejection piston 26.

In accordance with the present invention, the wires 16 and 17 and the line cord 19 are supported in the interior of the mold cavity by a plurality of thin metallic blades 23, 24 and 25. As can be better seen in FIG. 3, the blades 24-25 have a contour formed into their upper edge which mates with and captures wire 17. That is, the upper edge of blades 24 and 25 have a contour which is slightly more than a half of the periphery of wire 16 and thus are able to "grab" the soft insulation of wire 17 and hold it in position. Blade 23 has a contour in its upper edge which mates with the double wire line cord 19 and also extends beyond the semicircular periphery of the two wire of line cord 19 to hold the line cord in position.

It will be noted that the cavity formed by the two dies is extremely thin and hence very little leeway is available for the placement of wires 16 and 17 and line cord 19 within the cavity 11. If these wires are not placed precisely in the molding cavity, and held in that position during the entire injection process, the wires will be moved by the advancing molten plastic and possibly end up being in contact with the exterior surface of the mold cavity 11. When the molded plug is removed from the mold cavity (by piston 26, FIG. 2) after the molten plastic has hardened, any wires pushed to the surface of the mold cavity are visible at the surface of the completed plug. This result is called "wire breakout" and is sufficiently unaesthetic to result in rejection of molded products exhibiting such wire breakout.

In accordance with the present invention, retractable positioning blades 23, 24 and 25 position the non-rigid wires 16 and 17 and line cord 19 precisely within the mold cavity and maintain these non-rigid components at that precise position throughout the molding process. The number and positions of the blades such as blades 23-25 are directly dependent on the desired disposition of the wires within the cavity and the length of the wire runs requiring support. The three blades 23-25 in FIG. 1 are sufficient for the wires in the electrical plug depicted therein. Note, however, that all of the positioning blades 23-25 are introduced into the mold cavity 11 through the same one mold half (lower die 10), and that this side of the molded plug is the side which faces the wall when the plug is inserted into a standard wall outlet. Thus, any imperfections in the surface of the molded plug caused be the withdrawal of the blades 23-25 are located on the least visible surface of the finished product.

Blades 23-25 can be retracted, for example by hydraulic pistons, not shown, just before the packing portion of the molding cycle so that the voids formed by the retracted blades can be filled by the still flowing plastic material. Alternately, and preferably, the blades 23-25 can be spring-loaded such that they are held in the position-stabilizing position for the initial portion of the injection cycle, but are pushed out of the mold cavity 11 by the higher pressure exerted during the packing portion of the injection cycle. As a further alternative, the blades 23-25 can be retracted after the entire molding cycle is completed, leaving the thin slots from which the blades are removed in the finished molded product. If blades 23-25 are thin enough and positioned so as to minimize the appearance of such slots, it may not be necessary to fill the voids left by blades 23-25 at all. Indeed, the surface of the finished product can be decorated with slot-like decorations in the midst of which the actual blade slots become virtually invisible.

Figure 2:
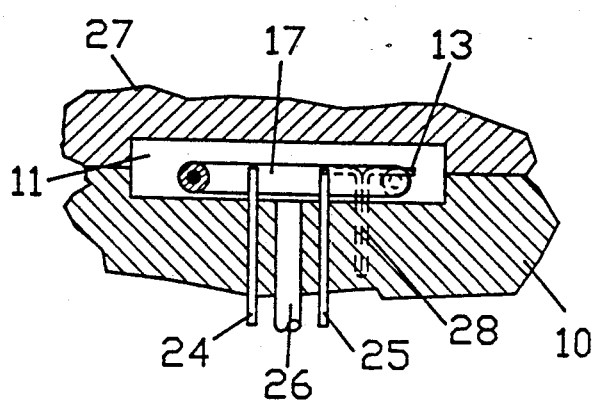
FIG. 2 shows a partial cross-sectional view of the injection mold of FIG. 1 showing the position-holding blades in the extended position holding non-rigid wires in a precise location between the upper and lower surfaces of the mold cavity.
Figure 3:
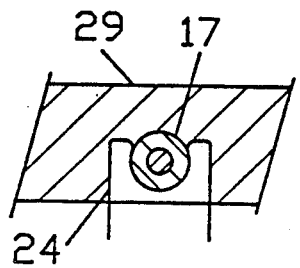
FIG. 3 shows a partial cross-sectional view of the molded product produced by the mold of FIG. 2, showing one position-holding blade.

In FIG. 2 there is shown a partial cross-sectional view of the assembled mold comprising lower die 10 and a mating upper die 27 forming the mold cavity 11 therebetween. The electrical prong 28 attached to land 13 supports land 13 in the interior of cavity 11 while blades 24 and 25 support wire 17 in the interior of cavity 11. FIG. 3 is a partial cross-section of the molded plug 29 showing the wire 17 suspended therein and supported by blade 24.

Figure 4:
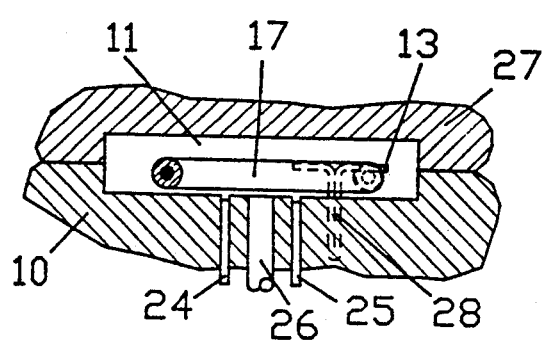
FIG. 4 shows another partial cross-sectional view of the injection mold of FIG. 1 showing the position-holding blade retracted.
Figure 5:
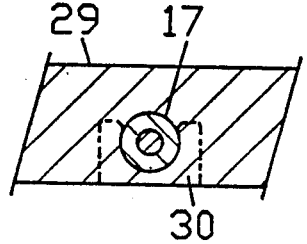
FIG. 5 shows a partial cross-sectional view of the molded product produced by the mold of FIG. 4 with the position-holding blade retracted.

In FIG. 4 there is shown a partial cross-sectional view of the same assembled mold of FIG. 2, but with the positioning blades 23-25 retracted out of the molding cavity 11. In FIG. 5 there is shown a partial cross-section of the molded plug 29 with the wire 17 suspended in the hardened plastic and with the supporting blades 23-25 removed, leaving cavity void 30. As noted above, void 30 can be filled by retracting the blade prior to the packing portion of the injection cycle, or the void 30 can be left unfilled by retracting the blade after the end of the injection cycle and after the plastic has hardened.

Although the method and apparatus of the present invention for positioning non-rigid components in the interior of molded products is shown in FIGS. 1-5 in connection with molded electrical plugs, it will be apparent to persons of ordinary skill in the injection molding art that this method and apparatus can be used for positioning components in the interior of many other molded products, whether rigid or non-rigid. Thin blades or forks are used having the edge interior to the mold cavity contoured to match the exterior surface of the component to be positioned. Such blades or forks can be used to precisely position a large number of encapsulated components within the interior of molded plastic products without departing from the spirit or scope of this invention.

Although the technique described in connection with FIGS. 1-5 can be used to position many different types of components within the interior of molded products, it is also possible to make use of one or more of the encapsulated components itself to assist in positioning a different encapsulated component. Such and extended positioning technique is disclosed in FIG. 6-8 in connection with a three-pronged, grounded molded electrical plug.

In FIG. 6 there is shown a perspective view, in partial section, of a three-prong electrical plug fabricated by injection molding techniques in accordance with the present invention. The plug body 40 encapsulates the three wires of the three-wire line cord 41 as well as stabilizing lands for ground pin 42 and power pins including pin 43 and a second power pin, not visible in FIG. 6. The upper portion of ground pin 42 has two channel-forming tabs 44 and 45 used to assist in capturing the electrical wire 46 connected to power pin 43. Thin blades with appropriately contoured upper edges are also used to assist in positioning wire 46 in other portions of the mold cavity. The mold cavity is shown in cross-section in FIG. 7.

In FIG. 7, the two half molds 50 and 51 define a mold cavity 52 therebetween in which wire 46 is positioned in part by blades 53 and 54 and in part by the upper portion of ground pin 42, shown in perspective view in FIG. 8. The tabs 44 and 45 capture wire 46 to hold wire 46 in position during the molding process. Since wire 46 is fully insulated, the contact by tabs 44 and 45 does not interfere with the electrical circuit. A crimping land 56 is also fashioned on ground pin 42 to provide a place to electrically and mechanically connect the ground wire of line cord 41 to the ground pin 42.

It should be clear to those skilled in the art that further embodiments of the present invention may be made by those skilled in the art without departing from the teachings of the present invention.

What is claimed is:

1. An injection molding apparatus for electrical plugs comprising
   at least two molding dies defining therebetween a parting line, a molding cavity for the injection of molten plastic, and an entry port for said molten plastic along said parting line,
   at least two flat rigid positioning blades extending into said cavity from a first one of said molding dies for positioning an electrical conductor within the interior of said cavity, said electrical conductor being surrounded by deformable electrical insulation having a substantially circular cross-section and being secured therein at least while said molten plastic is injected into said cavity,
   said positioning blades having at least one thin edge thereof facing the interior of said cavity contoured in a concave circular arc exceeding 180 degrees to capture said electrical insulation to releasably hold said electrical conductor in a fixed position within the interior of said cavity during said injection of said molten plastic by capturing said deformable insulation within said circular arc until the molded electrical plug is removed from said cavity,
   at least one rigid electric prong having a first stabilizing portion thereof to be encapsulated in the interior of said cavity and connected to said electrical conductor, and a second portion extending out of said cavity through a slot formed in said first one of said molding dies, and
   means associated with said at least one rigid electric prong for holding said electrical conductor in position in the interior of said cavity with respect to said stabilizing portion.

2. The injection molding apparatus according to claim 1 further comprising
   means for retracting said positioning blades from said interior of said cavity.

* * * * *